United States Patent Office 2,833,778
Patented May 6, 1958

2,833,778

PROCESS FOR PREPARATION OF CARBOXYL DERIVATIVES OF CERTAIN N-HETEROCYCLICS BY OXIDATION

Alfred Saffer, Bayside, N. Y., and Robert S. Barker, Plainfield, N. J., assignors, by mesne assignments, to Mid-Century Corporation, Chicago, Ill., a corporation of Delaware No Drawing. Application March 22, 1955
Serial No. 496,068

13 Claims. (Cl. 260—295)

This invention relates to processes for the catalytic oxidation of heteroaromatic compounds containing aliphatic substituents to produce the corresponding heteroaromatic carboxylic acids, using air or other molecular oxygen containing material as the oxidizing means; and more particularly to such processes catalyzed by a combination of one or more heavy metal ions together with bromine ions, such as manganese bromide.

Commercially useful heteroaromatic carboxylic acids may be prepared by chemical oxidation of analogous alkyl substituted heteroaromatic compounds; e. g., the pyridine carboxylic acids prepared from alkyl pyridines by oxidation with nitric acid in the presence of sulfuric acid at temperatures above about 250° C., or the oxidation thereof with sulfuric acid in the presence of a selenium catalyst at about 275° C. The pyridine-3-carboxylic acid (nicotinic acid) is useful in vitamin preparations; and pyridine-4-carboxylic acid (isonicotinic acid) is useful as an intermediate for the preparation of certain drugs. The art is confronted by the problem of providing the heteroaromatic carboxylic acids in a more convenient and economic manner.

The discoveries associated with the invention and relating to solutions of the above problems and the objects achieved in accordance with the invention as described herein, include the following: the catalytic oxidation by means of molecular oxidation containing gaseous material of a heteroaromatic compound having at least one aliphatic substituent in the presence of one or more heavy metal ions together with bromine ions; such a process wherein each aliphatic carbon atom attached directly to a nuclear carbon atom contains at least one substituent other than carbon and the aliphatic substituent contains from 1 to 4 carbon atoms per heteroaromatic nuclear carbon atom to which it is attached; such a process carried out in the presence of a lower monocarboxylic acid having about 1 to 8 carbon atoms in the molecule, preferably saturated and having 2 to 4 carbon atoms, and preferably using about 1 to 10 parts by weight of this acid per part of the substituted heteroaromatic compound; such a process wherein the catalyst is manganese bromide; such a process applied specifically to mononuclear heteroaromatic materials having alkyl substituents wherein each alkyl contains 1 to 4 carbon atoms; and other objects which will be apparent as details or embodiments of the invention are set forth hereinafter.

In order to facilitate a clear understanding of the invention, the following preferred specific embodiments are described in detail:

Example 1

Into a suitable reactor having a corrosion resistant inner surface (e. g., glass, ceramic or corrosion resistant metal or alloy), equipped with agitating means such as a mechanical agitating device or gas flow agitating means, and with means for heating or cooling the contents thereof such as a coil or jacket, optionally a reflux condenser equipped with a separatory device for collecting water and refluxing non-aqueous condensate to the reaction vessel, a gas inlet tube, and a vent for passing off low boiling materials, there are charged:

100 parts by weight of 3-methyl pyridine (3-picoline, or beta-picoline)
125 parts of acetic acid (100%)
1.0 part of manganese acetate
1.0 part of cobalt octoate
1. part of ammonium bromide The reaction vessel is about half filled with the liquid mixture.

Air is fed into the reaction mixture at the rate of 400 liters (measured at the reactor exit at atmospheric pressure and about 27° C.) per hour, while the reaction mixture is maintained at 385° F. (196° C.), with vigorous agitation, for two hours; and the pressure is maintained at about 400 p. s. i. g. (pounds per square inch gauge); this pressure being such that the reaction mixture contains a liquid phase containing lower carboxylic acid.

The crude solid pyridine 3-carboxylic acid (nicotinic acid) in the mixture may be recovered by distillation of the acetic acid and isolated as the copper salt. Filtration of the reactor charged yielded about 35 parts of crude acid. The first cut boiling up to about 118° C. is acetic acid, the second cut boiling in the range of about 136–160° C. contains the azeotrope of 3-methylpyridine and acetic acid. The residue (about 60 parts) in the stillpot is essentially crude pyridine 3-carboxylic acid, and may be further purified as above. In this way, about 90 to 95 parts of pyridine 3-carboxylic acid is obtained (90 to 95 weight percent yield). The nicotinic acid-acetic acid salt may be purified by recrystallization from aqueous acetic acid.

Example 2

The above example is repeated except using:

75 parts of 4-methylpyridine (4-picoline)
125 parts of acetic acid
1 part manganese bromide at a temperature of 400° F. (204° C.), and about 30.5 parts of crystalline pyridine 4-carboxylic acid (isonicotinic acid) is obtained (about 41 weight percent yield). Unreacted 4-methylpyridine may be separated from the distillate by neutralization with aqueous caustic soda, and separation of the resulting layers.

Desirable or comparable results are achieved with various modifications of the foregoing, including the following. The pressure should be sufficient to maintain a liquid phase and if a lower monocarboxylic acid is included in the system, a liquid phase should contain at least some of the said acid. Generally, the pressure may be in the range of atmospheric up to about 1500 p. s. i. g.

The process may be conducted in a batch, intermittent, or a continuous manner.

Where the reaction system is such that the desired acid may be obtained directly or readily separated from the reaction mixture, even though no additional medium is present, it is preferred to avoid any such added medium; this condition may best be obtained in a cyclic reaction system where intermediate oxidation products are recycled to the initial reaction step. Where all the advantages of such an operation are not required, the medium may be included and this may be any monocarboxylic acid relatively stable or inert to oxidation in the reaction system, preferably containing about 1 to 8 carbon atoms in the molecule. In addition, saturated aliphatic acids containing 2 to 4 carbon atoms in the molecule and free of hydrogen atoms attached to tertiary carbon atoms are preferred. Benzoic acid may be used. Mixtures of acids may be used.

The reaction temperature should be sufficiently high so that the desired oxidation reaction occurs and yet not so high as to cause undesirable charring or formation of tars, for instance in the range of 150 to 275° C., desirably 150 to 250° C., and preferably 160 to 210° C. The reaction time should be sufficient to obtain a desirable conversion of the substituted heteroaromatic material to the desired heteraromatic carboxylic acid, e. g., in the range of about 0.5 to 25 or more hours, preferably up to about 4 hours.

Where the monocarboxylic acid medium is used, the amount thereof should not be more than necessary for convenience of handling or provision of the desired product, such as in the range of 1 to 10 parts by weight, desirably 1 to 4, and preferably 1 to 2.5 per part of the heteroaromatic material.

The catalyst is indicated as manganese bromide, and may be added as such or by the addition of materials which can provide a catalytic amount of the metal and the bromine in the reaction system. Preferably manganese is added in the form of the acetate or analogous carboxylate salts including a carboxylic acid which may be formed in the reaction system; and the bromine is added in the form of ammonium bromide or analogous bromine compounds soluble in the system. If desired, the bromine may be added in the form of an organic bromide soluble in the system. The amount of the catalyst calculated as $MnBr_2$ may be in the range of about 0.1 to 10% or more by weight of the heteroaromatic material, desirably 0.3 to 2, and preferably 0.50 to 1.7%. Mixtures of materials may be used; and the proportions of manganese and bromine may be varied from the stoichiometric proportions, e. g., in the range of about 1 to 10 atoms of manganese to 10 to 1 atoms of bromine. Ammonium bromide in the absence of a heavy metal has little or no catalytic activity, and other manganese halides also show lower or little catalytic activity in such reaction systems. Where all the advantages of the manganese bromide are not required, other heavy metal bromides may be used such as of cobalt and the like. Mixtures of heavy metal bromides may be used.

The oxygen used may be in the form of substantially 100% oxygen gas or in the form of gaseous mixtures containing lower concentrations of oxygen, e. g., down to about 20%, such as in air.

The ratio of total oxygen fed into the reaction mixture relative to the heteroaromatic compound is in the range of 4 to 500 mols of oxygen per mol of substituted heteroaromatic material, desirably in the range of 5 to 300, and preferably in the range of 5 to 75.

The substituted heteroaromatic material fed into the reactor may be a pyridine, quinoline, isoquinoline, or the like heteroaromatic material having one or more alkyl substituents, in technically pure form, free from contaminants or materials which may interfere with the oxidation reaction. Preferably, the 2-position is unsubstituted. It may be a mixture of isomeric materials or such a mixture containing lower or higher homologues. It may also contain some saturated aliphatic hydrocarbon materials of similar boiling ranges relatively resistant to oxidation in the system. Mixtures of materials may be used, converted to the corresponding mixtures of heteroaromatic carboxylic acids, which acids may then be separated, e. g., by physical means such as distillation, or by a combination of chemical and physical means such as esterification followed by fractionation.

Aliphatic substituents on the heteroaromatic nuclear may be bifunctional groups attached to two different heteroaromatic carbon atoms, e. g., tetrahydroisoquinoline which provides two aliphatic carbon atoms for each substituted heteroaromatic carbon atom. The substituent may contain 1 to 8 aliphatic carbon atoms per substituted heteroaromatic carbon atom. Preferably, each substituent is a lower alkyl; for the tertiary butyl group, the more strenuous oxidation conditions are used, desirably with a synergistic mixture of manganese and cobalt catalysts. One or more of the substituents may be converted to the corresponding carboxylic acid group. Noninterfering substituents may be present in the compound, e. g., a chloro group.

Partial oxidation products of the above-mentioned materials may also be treated; e. g., analogous to the aliphatic substituents converted to intermediate oxygenated derivatives, such as alcohols, ketones, aldehydes, peroxide type compounds, acids, and the like.

The substituted heteroaromatic compounds which are treated in accordance with the invention may contain one or more heteroaromatic rings; e. g., pyridine, quinoline, isoquinoline, acridine, and the like having the above-mentioned aliphatic substituents.

In view of the foregoing disclosures, variations and modifications of the invention will be apparent to those skilled in the art, and it is intended to include within the invention all such variations and modifications except as do not come within the scope of the appended claims.

We claim:

1. A process for producing heteroaromatic carboxylic acids which comprises oxidizing a substituted heteroaromatic compound selected from the group consisting of alkyl-substituted and partially oxidized alkyl-substituted pyridine, quinoline, isoquinoline and acridine in the liquid phase with molecular oxygen in the presence of catalytic amounts of heavy metal and bromine catalysts and recovering said heteroaromatic carboxylic acid.

2. A process of claim 1 wherein each substituent contains from 1 to 8 carbon atoms per heteroaromatic nuclear carbon atom to which it is attached, and the carbon atom of said substituent which is attached directly to a heteroaromatic carbon atom contains at least one substituent other than carbon.

3. A process of claim 2 wherein at least one of the aliphatic substituents is methyl.

4. A process of claim 1 wherein the catalyst is at least one member of the groups consisting of cobalt and manganese bromides.

5. A process of claim 4 wherein the catalyst is a mixture of cobalt and manganese bromides.

6. A process of claim 1 wherein the catalyst comprises manganese bromide, carried out in the presence of a monocarboxylic acid inert to oxidation and having about 1 to 8 carbon atoms in the molecule, the temperature being in the range of 150 to 275° C., and the pressure in the range of 0 to 1500 p. s. i. g. to maintain a liquid phase containing said monocarboxylic acid.

7. A process of claim 6 wherein the acid is aliphatic and contains 2 to 4 carbon atoms.

8. A process of claim 7 wherein the acid is acetic.

9. A process of claim 8 with a ratio of 1 to 10 parts by weight of the acid per part of the heteroaromatic material, the latter contains only one aliphatic substituent and it is in a position other than the 2-position.

10. A process of claim 9 wherein the catalyst is introduced as manganese acetate plus ammonium bromide, and the acid is acetic.

11. A process of claim 9 wherein the hydrocarbon is 3-methylpyridine, the catalyst is manganese bromide, the acid is acetic, and the oxidation product is pyridine 3-carboxylic acid.

12. A process of claim 9 wherein the hydrocarbon is 3-methylpyridine, the catalyst is cobalt bromide, the acid is acetic, and the oxidation product is pyridine 3-carboxylic acid.

13. A process of claim 9 wherein the heteroaromatic compound is 4-methylpyridine, the catalyst comprises cobalt bromide, the acid is acetic, and the product is pyridine 4-carboxylic acid.

(References on following page)

References Cited in the file of this patent

UNITED STATES PATENTS

| | | |
|---|---|---|
| 2,245,528 | Lader | June 10, 1941 |
| 2,415,800 | Rust et al. | Feb. 11, 1947 |
| 2,476,004 | Teeters | July 12, 1949 |
| 2,515,593 | Engel et al. | July 18, 1950 |
| 2,552,267 | Emerson et al. | May 8, 1951 |
| 2,712,549 | Cheney | July 5, 1955 |
| 2,723,994 | Haefele et al. | Nov. 15, 1955 |

FOREIGN PATENTS

| | | |
|---|---|---|
| 563,274 | Great Britain | Aug. 8, 1944 |
| 1,017,881 | France | Oct. 1, 1952 |

OTHER REFERENCES

Wibaut: Organic Chemistry, 1951, page 565, Elsevier Publishing Co., N. Y.